United States Patent [19]

Takeoka et al.

[11] Patent Number: 4,565,772

[45] Date of Patent: Jan. 21, 1986

[54] PROCESS OF USING RADIATION-SENSITIVE CARRIER BODY TO FORM STAMPER STRUCTURE AND SUBSEQUENT USE AS A STAMPER TO MAKE OPTICAL DISKS

[75] Inventors: Yoshikatsu Takeoka, Kawasaki; Nobuaki Yasuda, Zushi; Akio Hori; Norio Ozawa, both of Kawasaki, all of Japan

[73] Assignee: Tokyo Shibaura Denki Kabushiki Kaisha, Kawasaki, Japan

[21] Appl. No.: 630,232

[22] Filed: Jul. 12, 1984

Related U.S. Application Data

[62] Division of Ser. No. 535,205, Sep. 23, 1983.

[30] Foreign Application Priority Data

Sep. 29, 1982 [JP] Japan .................. 57-168623
Dec. 27, 1982 [JP] Japan .................. 57-226711
Dec. 27, 1982 [JP] Japan .................. 57-226712

[51] Int. Cl.⁴ .................. G03C 5/00; B29D 17/00; B29C 43/00
[52] U.S. Cl. .................. 430/320; 430/290; 430/321; 430/945; 430/322; 430/324; 156/242; 156/244.17; 156/244.26; 156/245; 264/1.4; 264/106; 264/107; 346/76 L; 346/135.1
[58] Field of Search .......... 430/321, 320, 945, 290, 430/324, 322; 346/76 L, 135.1; 264/1.4, 106, 107; 156/242, 244.17, 244.26, 245

[56] References Cited

U.S. PATENT DOCUMENTS

| | | | |
|---|---|---|---|
| 4,141,731 | 2/1979 | Jarsch | 264/106 |
| 4,165,351 | 8/1979 | May . | |
| 4,285,839 | 8/1981 | Wong . | |
| 4,430,401 | 2/1984 | Wilkinson | 430/321 |
| 4,440,586 | 4/1984 | Lippits et al. | 156/245 |
| 4,470,053 | 9/1984 | Moffitt et al. | 346/135.1 |
| 4,478,768 | 10/1984 | Takeoka et al. | 264/1.4 |

FOREIGN PATENT DOCUMENTS

| | | | |
|---|---|---|---|
| 0029749 | 6/1981 | European Pat. Off. . | |
| 32005 | 7/1981 | European Pat. Off. | 264/108 |
| 0058496 | 8/1982 | European Pat. Off. . | |
| 0070468 | 1/1983 | European Pat. Off. . | |
| 0089775 | 9/1983 | European Pat. Off. . | |
| 2061594 | 5/1981 | United Kingdom . | |
| 2061595 | 5/1981 | United Kingdom . | |

OTHER PUBLICATIONS

Patents Abstracts of Japan, vol. 3, No. 98, Aug. 18, 1979, p. 97 E131 & JP-A-54 76106-(Filed in Parent).

Primary Examiner—Charles L. Bowers, Jr.
Attorney, Agent, or Firm—Oblon, Fisher, Spivak, McClelland & Maier

[57] ABSTRACT

A radiation-sensitive carrier body directly utilized as a stamper has a glass substrate, a first highly adhesive layer securely adhered to the substrate, a radiation-sensitive layer which discharges a gas component upon being irradiated with a laser beam and which locally forms a protuberance due to the absorbed energy, a second highly adhesive layer securely adhered to the specific material of the radiation-sensitive layer and which deforms in accordance with deformation of the layer, and a metal layer which has a high releasability to allow easy separation from a optical disk substrate material such as an acrylic material when the carrier body is used as a stamper substrate for manufacturing optical disks. A protuberance formed on the carrier body such as a continuous spiral protuberance allows formation of a corresponding spiral groove in the acrylic material, serving as a pre-track into which desired information will be digitally written by a user.

6 Claims, 14 Drawing Figures

PROCESS OF USING RADIATION-SENSITIVE CARRIER BODY TO FORM STAMPER STRUCTURE AND SUBSEQUENT USE AS A STAMPER TO MAKE OPTICAL DISKS

This is a division of application Ser. No. 535,205 filed Sept. 23, 1983.

BACKGROUND OF THE INVENTION

The present invention relates in general to an optical type record carrier body and, in particular, to a radiation-sensitive record carrier body which is utilized as a stamper structure for manufacturing an optical type data recording disk.

In order to stabilize a servo-tracking operation and to improve recording density, it is known in the prior art to form an indentation which serves as a track of a predetermined shape in a recording medium such as an optical disk in which information is recorded digitally in accordance with an energy beam such as a laser beam radiated thereupon. Such a track or a pre-track is formed on the surface of a recording layer of an optical disk as either a protuberance or a groove, and in the form of either a continuous spiral or a discontinuous concentric pattern. The servo-tracking operation is carried out in accordance with a difference between reflectances of the track portion of the optical disk and the remaining flat portion thereof.

In order to manufacture a read/write optical disk having such a pre-track on which desired information may be digitally recorded or from which such information may be digitally reproduced by a user, a stamper having a surface configuration conforming to the pre-track must first be prepared. Conventionally, a master or original disk having a track is prepared Then, an electroforming technique, for example, is used to prepare a stamper structure having a surface pattern opposite to that of the original disk. Using this stamper, optical disks having identical surface configurations, that is, tracks transferred thereto from the stamper, which are the same as that of the original disk, are manufactured. The optical disks are prepared by injection molding, compression molding or pouring of an organic resin, or by curing an ultraviolet curing resin.

Conventionally, the stamper structure with a continuous spiral pre-groove or track is manufactured as follows. A chrominum film is formed on a top surface of a transparent substrate comprising disk-shaped glass (of, e.g., 300 mm diameter). A photoresist material is applied by a spinner or the like to the surface of the chromium film, thus forming a photoresist film. The substrate having the photoresist film formed thereon in the manner described above is then rotated at a predetermined speed. A laser beam is then focused to radiate the photoresist film of the rotating substrate so as to form a beam spot of 4,000 Å or 4 $\mu$m in diameter. This laser beam is moved at a constant feed speed along the radial direction of the rotating disk-shaped substrate. When irradiation by the laser beam is completed, the structure exposed to the laser beam is etched, thereby obtaining an original disk which has a continuous spiral pre-groove. The track may alternatively comprise a projection or ridge, depending on the type of photoresist material. An electrode is deposited on the original disk, and the obtained structure is subjected to electroforming. A disk structure having a transferred indentation of the original disk is separated therefrom to form a stamper.

However, in the prior art, it is very difficult to uniformly form the spiral track portion to have a width of 1 $\mu$m and a depth of 0.08 $\mu$m over the entire surface of the disk-shaped structure of 300 mm in diameter. In general, when the photoresist material is applied to the substrate to form a photoresist film having a thickness of the order of microns, the photoresist film tends to partially peel off from the disk-shaped substrate. As a result, uniformity of the film cannot be expected. In particular, when the photoresist film is formed to have a thickness of the order of submicrons, the photoresist material must be diluted before being applied to the surface of the substrate. As a result, the uniformity of the photoresist film is further degraded, and irregular development and etching occur. Nonuniformity occurring at the beginning of the stamper manufacturing process results in a definite fault in the optical disk. In this manner, a spiral track having the dimensions described above over the entire surface of the substrate of the optical disk is extremely difficult to form.

Further, according to the prior art stamper, when the photoresist film is separated from the stamper, the photoresist film may partially remain on the stamper due to baking or the like. In addition to this, since the stamper structure is prepared from an original disk, the manufacturing process involves a large number of steps and is complex, requiring further improvements.

SUMMARY OF THE INVENTION

It is an object of the present invention to provide a new and improved radiation-sensitive record carrier body which allows uniform formation of a protuberance serving as a track at high precision over its entire surface, and which can be effectively utilized as a stamper structure.

According to the present invention, a record carrier body, which is preferably utilized as a stamper structure for manufacturing optical disks, comprises a radiation-sensitive layer which absorbs energy from a beam with which the layer is irradiated and which locally expands and deforms in accordance with the absorbed energy. This radiation-sensitive layer is made of a specific material for absorbing the energy of a radiation beam such as a laser beam and discharging a gas component in accordance with the absorbed energy. The carrier body on which a continuous spiral protuberance, for example, is formed by irradiation with an energy beam is used as a stamper structure for molding a substrate material for optical disks. Then, an optical disk is prepared which has a spiral groove serving as a pre-groove track corresponding to the pattern of the spiral protuberance. Desired information can be written on the track at a user side. The record carrier body of the present invention further comprises a substrate supporting thereon the radiation-sensitive layer; a first adhesive layer which is interposed between the substrate and the radiation-sensitive layer and which has an adhesion strength sufficient to effectively adhere the radiation-sensitive layer to the substrate; a metal layer which has a sufficient release property from a preselected substrate material such as a resin used in manufacturing the optical disk; and a second adhesive layer which is interposed between the radiation-sensitive layer and the metal layer and which has an adhesion strength sufficient to effectively adhere the metal layer to the radiation-sensitive layer.

BRIEF DESCRIPTION OF THE DRAWINGS

The present invention is best understood by reference to the accompanying drawings, in which.

DETAILED DESCRIPTION OF THE PREFERRED EMBODIMENTS

Figure 1A:
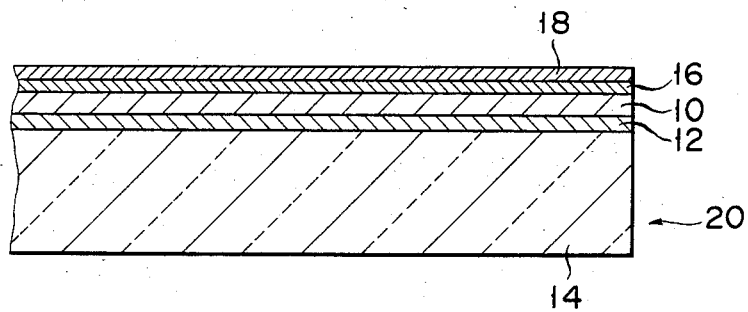
FIG. 1 illustrates, in schematic cross-section, some of major steps in the manufacture of optical disks by using a stamper according to a first embodiment of the present invention.

FIGS. 1A to 1E show main steps in the manufacture of optical disks, on and from which information can be digitally recorded or reproduced at the user side, using as a stamper an optical type record carrier body according to the first embodiment of the present invention. Referring to FIG. 1A, a radiation-sensitive layer 10 is formed through a thin, first highly adhesive layer 12 over the entire surface of a disk-shaped transparent substrate 14 made of a glass material and having a diameter of 300 mm. This layer 10 is made of a material which absorbs irradiation energy upon being irradiated with an energy beam such as a laser beam, and generates a gas component to form a protuberance. The material for the layer 10 is preferably selected from mixtures of one or more low-melting point metals such as tellurium (Te), antimony (Sb), tin (Sn), bismuth (Bi), indium (In), cadmium (Cd), zinc (Zn) and lead (Pb), and one or more elements which may be readily vaporized below a predetermined temperature (e.g., about 400° C.), such as nitrogen (N), carbon (C), hydrogen (H), oxygen (O), phosphorus (P), iodine (I), bromine (Br), and sulfur (S). In this embodiment, the layer 10 is preferably made of a mixture of a metal having a melting point of 600° C. or lower such as Te, Bi and the like and at least one element selected from C, N, H and O.

The layer 12 interposed between the substrate 14 and the radiation-sensitive layer 10 is made of a material which has a good adhesion strength with a material of the substrate 14 such as glass. Accordingly, the radiation-sensitive layer 10 is securely adhered to the substrate 14 through the layer 12 and is prevented from peeling off the substrate 14. This first highly adhesive layer 12 may consist of a metallic material or a dielectric material. The metallic material for the layer 12 may be selected from titanium (Ti), chromium (Cr), aluminum (Al), magnesium (Mg), tungsten (W), molybdenum (Mo), cobalt (Co), nickel (Ni), iron (Fe), tantalum (Ta), vanadium (V), zirconium (Zr), hafnium (Hf), and a mixture thereof. The dielectric material of the layer 12 is preferably semiconductor oxide insulating material such as $SiO_2$ or $TeO_2$.

In this embodiment, a Ti film of 300 Å thickness was formed by a known sputtering technique as the first highly adhesive layer 12 on the glass substrate 14. The radiation-sensitive layer 10 was formed by the plasma sputtering technique using a gas component such as $CH_3$, $NH_3$, $CO_2$ or $H_2$ in a vacuum atmosphere in which a target consisting of one of the low-melting point metal materials as described above was placed. For example, a Te target was sputtered in a $CH_4$ gas plasma to form a $Te_{50}C_{30}H_{20}$ layer 10 having a thickness of 4,000 Å on the layer 12. According to an experiment conducted by the inventors of the present invention, it was observed that this $Te_{50}C_{30}H_{20}$ layer 10 absorbed about 40% of laser energy of a wavelength of 8,300 Å. When the layer 10 was heated to a temperature of 150° C. or higher in the air, the layer 10 emitted a gas component which had been contained therein, with a consequent weight decrease of about 30%.

A second highly adhesive layer 16 and a highly moldable layer or highly releasable layer 18 were sequentially formed on the radiation-sensitive layer 10 in the order named. The layer 16 is preferably made of chromium (Cr), titanium (Ti), molybdenum (Mo), tungsten (W), iron (Fe), cobalt (Co), nickel (Ni), or a mixture thereof. The highly releasable layer 18 is made of a material such as gold (Au), silver (Ag) or palladium (Pd) which has a relatively small adhesion strength with a transparent organic material as the optical disk substrate material, such as polymethyl acrylate, polycarbonate or an epoxy resin. The layers 16 and 18 are formed by sputtering to have a thickness of, for example, 300 Å and 200 Å, respectively.

Figure 1B:
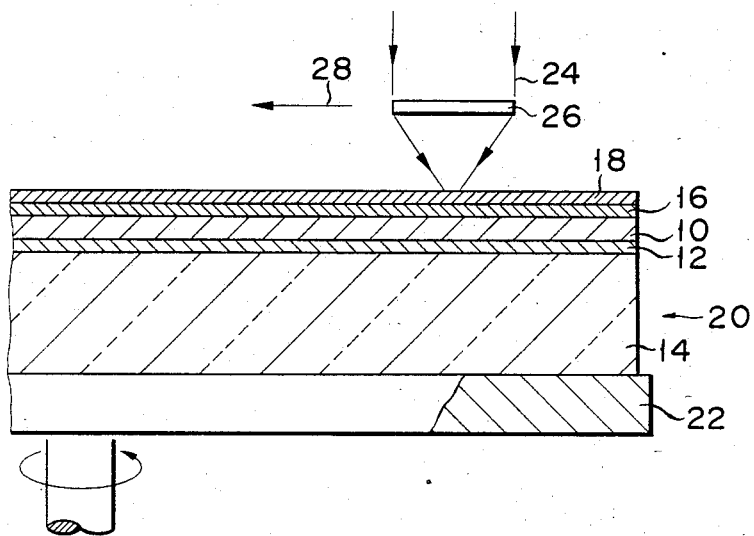

A record carrier body 20 having the stack structure as described above is securely fixed on a rotatable support table 22, as shown in FIG. 1B. While the record carrier body 20 is rotated at a linear speed of 4 m/sec by the table 22, the body 20 is irradiated with an argon laser beam 24. The laser beam 24 is focused by a known lens 26 to form a beam spot having a predetermined spot diameter of, for example, 1 μm on the top surface of the body 20. Referring to FIG. 1B, the laser beam 24 is scanned at a predetermined speed in the radial direction of the record carrier body 20 as indicated by arrow 28 so that the beam spot focused on the body surface forms a continuous spiral track. The laser beam 24 was a continuous modulation beam. The power of the laser beam 24 was set to reach 4 mW at the surface of the layer 18 of the body 20 such that the radiation-sensitive layer 10 could not be locally heated to form a hole.

Figure 1C:
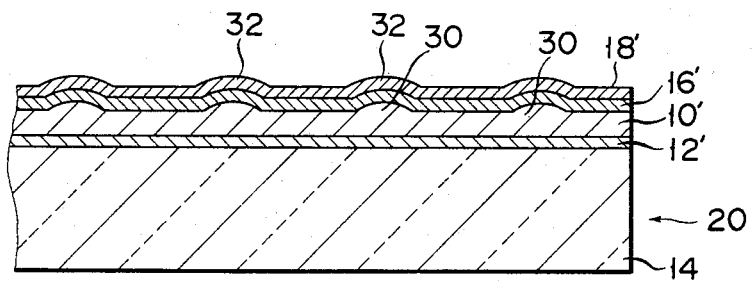

The focused laser beam 24 is transmitted through the layers 16 and 18 and radiates the underlying radiation-sensitive layer 10. As a result, in the body portion which is irradiated with the continuous beam, the layer 10 generates a gas component contained therein to form a continuous spiral protuberance 30, as shown in FIG. 1C. Upon this local expansion of the layer 10, the overlying layers 16 and 18 also form a corresponding configuration. Thus, a continuous spiral protuberance 32 having a uniform height of 0.1 μm and a bottom width of 1 μm is formed on the top surface of the record carrier body 20. This was confirmed by a scanning electron microscope.

Conventionally, a stamper is newly prepared using as a master a structure 20' thus obtained as shown in FIG. 1C. However, according to the present invention, the structure 20' is directly utilized as a stamper for manufacturing optical disks.

Figure 1D:
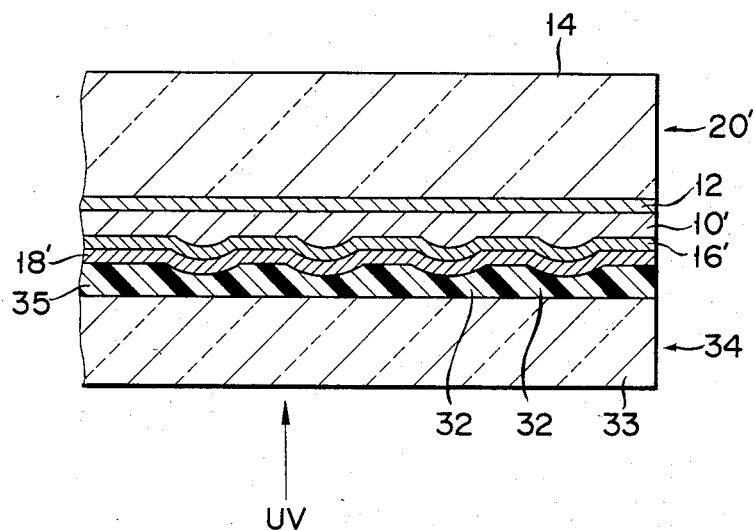
Figure 1E:
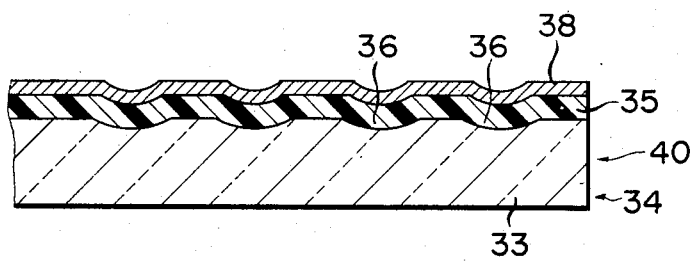

As shown in FIG. 1D, a plate 33 made of an acrylic resin is in tight contact with the surface of the record carrier body 20' as a stamper on which the continuous spiral protuberance 32 is formed. An ultraviolet curing resin is then introduced between the plate 33 and the stamper 20' to provide an ultraviolet curing resin layer 35. When ultraviolet curing is performed, a substrate 34 (including the plate 33 and the layer 35) for an optical disk (FIG. 1E) is obtained, a surface configuration of which is transferred thereto from the stamper 20'. The substrate 34 has a spiral groove 36 serving as a pre-groove which corresponds to the spiral protuberance 32 of the stamper 20'. A metal film 38 corresponding to a recording layer is uniformly deposited on the substrate 34, as shown in FIG. 1E. Thus, an optical disk 40 is finally obtained which is capable of recording or reproducing information. It should be noted that the substrate 34 may be obtained by using another method including the steps of introducing an acrylic-type thermal curing resin between the body 20' and a metal mold and performing heat curing.

According to the first embodiment of the present invention, the radiation-sensitive layer 10, which absorbs beam energy to discharge a gas component contained therein in accordance with the energy absorbed, is provided to prepare a stamper 20' with the continuous spiral protuberance 32, without using the photoresist film used in the prior art. Therefore, unlike a conventional stamper prepared by the electroforming technique from an original disk formed by the photoresist method, even if the track size is as small as 0.1 μm in depth and 1 μm in width or is even smaller, highly precise tracks can be easily formed over the entire surface of the stamper 20'. Thus, the track pitch can be decreased, thereby further increasing the recording density of optical disks which are obtained using the stamper 20'.

Furthermore, since the radiation-sensitive layer 10 is securely adhered to the stamper substrate 14 by the first highly adhesive layer 12, the layer 10 may not peel off from the stamper substrate 14 when the optical disk substrate 34 is separated from the stamper 20'. The second highly adhesive layer 16 formed on the radiation-sensitive layer 10 retains well the shape of the protuberance 30 formed in the radiation-sensitive layer 10 and also serves as a protective film which protects the radiation-sensitive layer 10 from any damage while the optical disk substrate 34 with the pre-groove 36 is being manufactured. Accordingly, a stamper 20' having an excellent track shape and a long life can be realized. Since the highly releasable layer 18 is made of a material which has a small adhesion strength with the organic resin of the optical disk substrate 34, it facilitates easy separation of the substrate 34 from the stamper structure 20'. Accordingly, this prevents any part of the substrate 34 from being left on the stamper surface. Thus, the reliability of the stamper 20' is improved.

Unlike the conventional method wherein an original optical disk is first prepared and a stamper is then prepared from the original optical disk by the electro-forming technique, in the structure of the present invention, a record carrier body on which a track is formed by laser beam irradiation is used as a stamper. Therefore, the manufacturing process is simplified according to the present invention.

A second embodiment of the present invention will now be described with reference to FIGS. 2A to 2C. In a disk-shaped body 50 shown in FIG. 2A, similar parts to those of the body 20 shown in FIG. 1A are denoted by the same reference numerals, and a detailed description thereof will be omitted.

An organic resin film 52 is deposited on the radiation-sensitive layer 10. The material of the film 52 is preferably a material which effectively transmits an energy beam adopted (a laser beam in this embodiment), which has a relatively low thermal deformation initialization temperature, and which has excellent mechanical elongation. Examples of such an organic resin may include polytetrafluoroethylene, polycarbonate, polypropylene, polyethylene, polyvinyl chloride, nylon and the like, which have thermal deformation initialization temperatures of 110° C., 130° C., 80° C., 70° C., 60° C. and 80° C., respectively, and have elongations of 80 to 250%, 100 to 130%, 200 to 400%, 90 to 800%, 300 to 400% and 300 to 400%, respectively. The organic resin film 52 of a selected resin can be formed by sputtering a target of the selected resin in a gas plasma of Ar or the like or by a thin film forming technique such as vacuum deposition. The film 52 may also be formed by plasma polymerization of a monomer gas. The film 52 shown in FIG. 2A was made of polytetrafluoroethylene.

The organic resin film 52 preferably has a thickness of 50 to 1,000 Å. If the thickness of the film 52 exceeds 1,000 Å, the gas component discharged from the layer 10 is largely absorbed within the film 52 and a desired protuberance having a height of 0.1 μm or more cannot be formed. Uniform formation of an organic thin film having a thickness of 1,000 Å can be performed by a thin film forming technique in a vacuum.

Figure 2A:
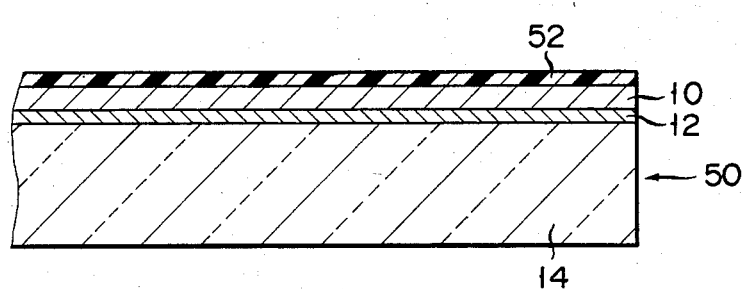
FIG. 2 illustrates, in schematic cross-section, some of major steps in the manufacture of a stamper according to a second embodiment of this invention.
Figure 2B:
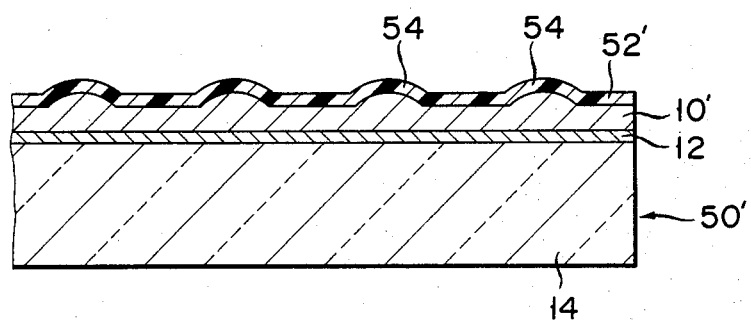
Figure 2C:
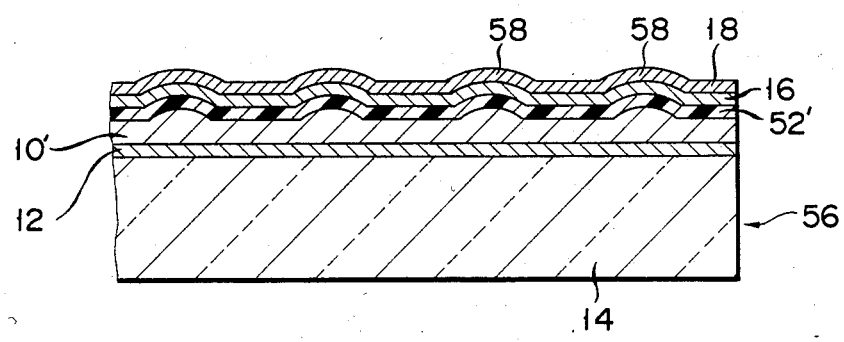

As another example of the embodiment shown in FIG. 2A, a $Te_{50}C_{30}H_{15}N_5$ film of 3,500 Å thickness as the radiation-sensitive layer 10 and a polytetrafluoroethylene film of 200 Å thickness as the organic resin film 52 were sequentially stacked on the first highly adhesive layer 12 on the glass substrate 14. In this case, the $Te_{50}C_{30}H_{15}N_5$ film was formed by sputtering a Te target in a gas plasma of a gas mixture substantially consisting of $CH_4$ gas and $NH_3$ gas in the mixing ratio of 4:1. The polytetrafluoroethylene film was formed by sputtering a target of the selected resin in an Ar gas plasma. In the Ar gas plasma sputtering, sputtering must be performed in the same vacuum chamber immediately after the film 52 is formed on the radiation-sensitive layer 10. Then, the films formed may not be subject to any adverse effect from dust in the air. The film 52 may be an Au film having a thickness of 300 Å in place of an organic resin film. However, when Ar laser beam irradiation (4,500 Å wavelength) is performed as energy beam irradiation, such an Au film reflected about 50% of the incident light and the laser energy absorbed in the layer 10 remained only 18% the original amount. In contrast to this, when the film 52 was made of transparent polytetrafluoroethylene, the ratio of the laser energy absorbed by the underlying layer 10 was increased to about 50%. Accordingly, the present inventors have concluded that the film 52 is preferably made of polytetrafluoroethylene.

The disk-shaped body 50 shown in FIG. 2A is subjected to continuous laser beam irradiation in a similar manner to that of the first embodiment shown in FIG. 1B. As a result, a continuous spiral protuberance 54 having a height of 0.1 μm and a width of 1 μm was uniformly formed over the entire surface of the body 50, as shown in FIG. 2B.

The present inventors prepared five disk-shaped bodies each having the structure as shown in FIG. 2A and having a film 52 comprising one of five different materials, respectively. More specifically, films 52 of polycarbonate, polypropylene, polyethylene, polyvinyl chloride, and nylon each having a thickness of 200 Å were formed on radiation-sensitive layers 10 consisting of $Te_{50}C_{30}H_{20}$ and having a thickness of 4,000 Å. The $Te_{50}C_{30}H_{20}$ films were formed by sputtering a Te target in a $CH_4$ gas plasma, and the overlying resin films 52 were formed by vacuum deposition. When these disk-shaped bodies were irradiated with a laser beam in the same manner as described above, continuous spiral protuberances of excellent shape were formed in respective cases. The body having the film 52 of polycarbonate and subjected to a laser beam power of 4 mW had a protuberance height of 0.09 μm. The body having the film 52 of polypropylene and subjected to a laser beam power of 3.5 mW had a protuberance height of 0.08 μm. The body having the film 52 of polyethylene and subjected to a laser beam power of 3.5 mW had a protuberance height of 0.08 μm. The body having the film 52 of polyvinyl chloride and subjected to a laser beam power of 3.5 mW had a protuberance height of 0.07 μm. The body having the film 52 of nylon and subjected to a laser beam power of 4 mW had a protuberance height of 0.07 μm.

Subsequently, a second highly adhesive layer 16 and a highly releasable layer 18 similar to those in the first embodiment are sequentially formed on an obtained structure 50' shown in FIG. 2B. Thus, as shown in FIG. 2C, a stamper structure 56 is obtained. A manufacturing process of optical disks using this stamper structure 56 is similar to that of the first embodiment and will not be repeated.

According to the second embodiment of the present invention, a similar effect to that obtained in the first embodiment is obtained. Furthermore, according to the second embodiment, the radiation-sensitive layer 10 and the organic resin film 52 may be easily formed by a conventional thin film forming process such as sputtering, evaporation, or the like. Accordingly, the films may be respectively formed to have a uniform thickness in a clean atmosphere containing none of the impurities found in the air such as dust, while preventing separation of the formed film. The thin film 52 of, for example, an organic resin is formed on the radiation-sensitive layer 10. The gas component locally discharged from the layer 10 upon laser irradiation is trapped beneath the thin film 52, and the protuberance portion is formed in the film 52 by the gas pressure. The protuberance 54 formed on the body 50' can be effectively controlled to have a required shape (height, width). For this reason, a spiral protuberance 58 of a stamper structure 56 to be manufactured thereafter can be precisely controlled.

A third embodiment of the present invention will now be described with reference to FIGS. 3A to 3C. A disk-shaped body 100 illustrated in FIG. 3A has a metal film 102 which is formed on an organic resin film 52 and which has a good elongation characteristic. The metal film 102 is preferably made of at least one material selected from the group consisting of gold (Au), titanium (Ti), chromium (Cr), platinum (Pt), palladium (Pd), silver (Ag), tantalum (Ta), molybdenum (Mo), zirconium (Zr), and the like. The metal film 102 is formed by sputtering in an Ar gas plasma using the metallic material as a target, or by a thin film forming technique such as vacuum deposition.

Figure 3A:
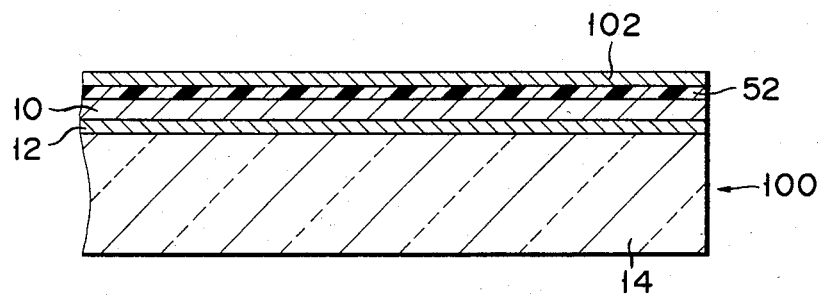
FIGS. 3 and 4 illustrate, in schematic cross-section, some of major steps in the manufacture of stampers in accordance with third and fourth embodiments of the present invention, respectively.
Figure 3B:
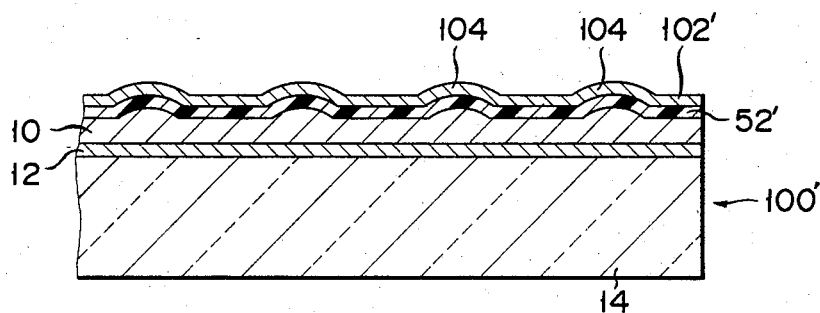
Figure 3C:
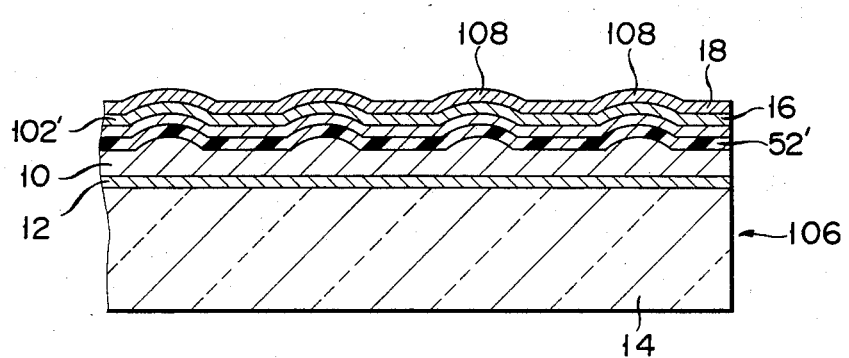

In the same manner as in the process shown in FIG. 1B of the first embodiment, the structure shown in FIG. 3A is subjected to laser irradiation. Then, a disk-shaped body 100' having a continuous spiral protuberance 104 is obtained, as shown in FIG. 3B. The protuberance 104 is formed in, for example, the Au film 102 since the organic resin film 52 itself partially decomposes to discharge a gas component whereby the gas pressure deforms the film 102. The Au film 102 easily deforms due to the gas pressure discharged from the underlying films 10 and 52 upon laser irradiation, and forms the continuous spiral track 104. Thereafter, a second highly adhesive layer 16 and a highly releasable layer 18 are sequentially formed on the structure 100' shown in FIG. 3B, to obtain a stamper structure 106 with a continuous spiral protuberance 108 shown in FIG. 3C. The process for manufacturing optical disks using this stamper 106 is similar to that of the embodiments described above, and will not be repeated.

According to the third embodiment, the film 102, which is made of a metal such as Au having an excellent elongation characteristic and which easily deforms into a protruding shape, is additionally formed on the organic resin film 52. Accordingly, the shape of the protuberance 104 of the disk-shaped body 100 can be made to remain stable even after time has elapsed (semipermanent) in accordance with the laser irradiation. The life of the stamper 106 to be manufactured later is prolonged and the reliability thereof is improved.

Figure 4A:
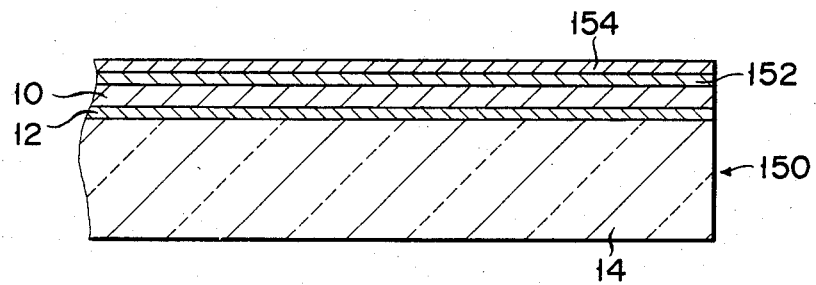

According to a fourth embodiment of the present invention, a disk-shaped body 150 has two metal films 152 and 154 on a radiation-sensitive layer 10 formed on a substrate 14 through a first highly adhesive layer 12, as shown in FIG. 4A. The radiation-sensitive layer 10 comprises, for example, a $Te_{50}C_{30}H_{15}N_5$ film having a thickness of 3,500 Å. The first metal film 152 formed directly on the layer 10 is preferably made of a metallic material containing at least one metal having a relatively high coefficient of thermal expansion, such as zinc (Zn), antimony (Sb), cadmium (Cd), thallium (Tl), magnesium (Mg), aluminum (Al), manganese (Mn), and silver (Ag). The first metal film 152 can be easily formed by sputtering of a target of the selected metallic material in an Ar gas plasma, or by vacuum deposition. The second metal film 154 is preferably made of a metallic material containing at least one metal having a relatively small coefficient of thermal expansion and a good mechanical elongation characteristic, such as gold (Au), palladium (Pd), platinum (Pt), titanium (Ti), chromium (Cr), tantalum (Ta), molybdenum (Mo), and zirconium (Zr). The second metal film 154 can be formed by sputtering or vacuum deposition as in the case of the first metal film 152. In the structure shown in FIG. 4A, a Zn film having a coefficient of thermal expansion of about $40 \times 10^{-6}$ deg$^{-1}$ and a thickness of 200 Å was formed as the first metal film 152, and an Au film having a coefficient of thermal expansion of $14 \times 10^{-6}$ deg$^{-1}$, a thickness of 200 Å and a good elongation characteristic was formed as the second metal film 154. The $Te_{50}C_{30}H_{15}N_5$ layer 10 was formed by sputtering a Te target in a mixture gas plasma substantially consisting of $CH_4$ gas and $NH_3$ gas in the mixing ratio of 4:1. In this case, immediately after the layer 10 is formed, the first and second metal films 152 and 154 are preferably formed in the same vacuum chamber so as to eliminate the adverse effect of dust or the like in the air.

The structure shown in FIG. 4A is subjected to laser irradiation in a similar manner to that shown in FIG. 1B. However, the power of the continuous modulated beam was 10 mW in this case. Upon laser irradiation, scanning electron microscope observation revealed that a continuous spiral protuberance track 156 having a uniform height of 0.1 μm and a bottom width of 1.1 μm was formed on the portion of an uppermost Au film 154' which had been irradiated with the laser beam. For the purpose of comparison, structures were prepared in which a Zn film of 200 Å thickness alone and an Au film of 200 Å thickness alone were formed on respective layers 10. When these structures were exposed to laser beam irradiation in the same manner as described above, the height of the protuberance could not made to exceed 0.05 μm in the former case and 0.03 μm in the latter case, irrespective of laser beam conditions such as the linear velocity of the table, the power of the laser beam, or the like. As a consequence, the present inventors were convinced of the importance of the bilayered structure of the fourth embodiment.

Figure 4B:
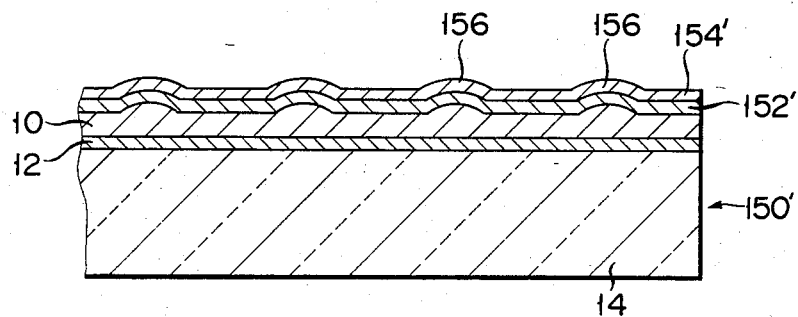
Figure 4C:
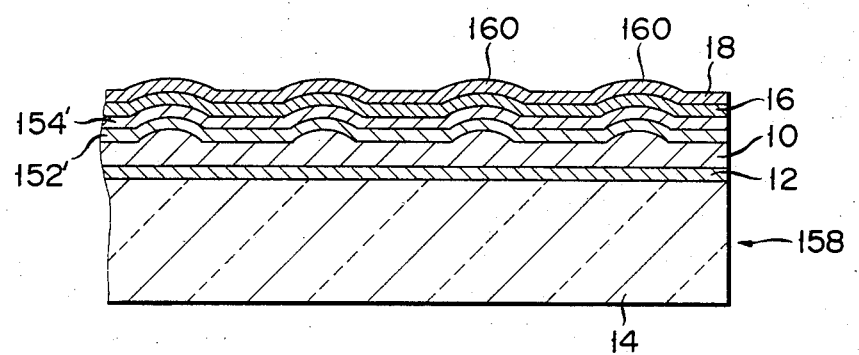

The first metal film 152 may be made of Sb, Tl, Mg, Al, Mn, Ag, or the like, which have coefficients of thermal expansion of $37 \times 10^{-6}$ deg$^{-1}$, $28 \times 10^{-6}$ deg$^{-1}$, $26 \times 10^{-6}$ deg$^{-1}$, $24 \times 10^{-6}$ deg$^{-1}$, $22 \times 10^{-6}$ deg$^{-1}$, and $20 \times 10^{-6}$ deg$^{-1}$, respectively. The second metal film 154 may consist of Pd, Pt, Ti, Ta, Cr, Mo, Zr, or the like, which have coefficients of thermal expansion of $12 \times 10^{-6}$ deg$^{-1}$, $9 \times 10^{-6}$ deg$^{-1}$, $9 \times 10^{-6}$ deg$^{-1}$, $7 \times 10^{-1}$, $6 \times 10^{-6}$ deg$^{-1}$, $5 \times 10^{-6}$ deg$^{-1}$, and $5 \times 10^{-6}$ deg$^{-1}$, respectively. It was confirmed that protuberances of satisfactory shape and having a height of 0.07 μm or more could be formed with any combination of these materials. After irradiation, a second highly adhesive layer 16 and a highly releasable layer 18 were sequentially stacked on a resultant structure 150' shown in FIG. 4B to obtain a stamper structure 158 with a continuous spiral protuberance 160.

In the fourth embodiment described above, the protuberance 156 is formed on the basis of the pressure of the gas component discharged from the radiation-sensitive layer 10 in accordance with the laser beam irradiation and the difference between the metal characteristics of the first metal film 152 as an interlayer and the second metal film 154 as an uppermost layer. Consequently, a protuberance of desired shape (height, width) can be easily formed. When a metal film 154 having good elongation characteristic is directly formed on the radiation-sensitive layer 10 which discharges a gas component upon absorption of heat energy, the shape of the protuberance (particularly its height) is determined largely depending upon the pressure of the gas component from the underlying layer 10. In contrast to this, when the metal film 152 as an interlayer is formed between the layer 10 and the film 154 as in the fourth embodiment, the height of the protuberance 156 may be increased. If the metal film 154 having a good elongation characteristic is not formed and the film 152 alone is formed on the layer 10, a protuberance of a great height may be obtained. However, the protuberance shrinks over time after laser beam irradiation is terminated. Thus, by forming the second metal film 154 having a good elongation characteristic on the first metal film 152, such shrinkage of the protuberance may be prevented and a protuberance of good shape may be semipermanently stabilized. The shape of the protuberance 160 of the stamper 158 can be controlled with good precision.

Although the present invention has been shown and described with respect to particular embodiments, various changes and modifications which are obvious to a person skilled in the art to which the invention pertains are deemed to lie within the spirit and scope of the invention.

In the embodiments described above, the record carrier body was irradiated with a laser beam to form a continuous spiral locus thereby forming a continuous spiral protuberance track. If the body is directly used as a stamper, optical disks can be manufactured which have spiral pre-grooves and which allow digital write/-read of desired information at a user side.

However, the present invention is not limited to this. For example, if a stamper is prepared by radiating the body with a pulse modulated laser beam for digitally representing desired information, read-only optical disks storing such information therein can be manufactured.

In the radiation-sensitive layer of this invention, a suitable organic compound containing an element which may be readily vaporized below a predetermined temperature may be plasma-polymerized to a metallic compound formed by using the known evaporation technique in order to prepare the radiation-sensitive layer. The radiation-sensitive layer of this invention may also be formed by using a plasma assist-CVD (chemical vapor deposition) technique using an organic metal compound made of a suitable metallic element and an element which is readily vaporized below a predetermined temperature, such as C, H or the like.

What is claimed is:

1. A method for manufacturing a stamper structure which is used to manufacture optical disks, comprising the steps of:
    (a) preparing a disk-shaped carrier body which has a radiation-sensitive layer which serves as a single recording layer which absorbs energy froma beam with which said layer is irradiated and which locally expands and deforms due to discharging of a gas component contained therein, a substrate for supporting said radiation-sensitive layer, and a first adhesive layer which is interposed between said substrate and said radiation-sensitive layer and which adheres said radiation-sensitive layer to said substrate;
    (b) additionally providing said carrier body with a metal layer, which has a releasability sufficient to easily separate it from a disk substrate made of a preselected material for manufacturing optical disks, and a second adhesive layer which is provided between said radiation-sensitive layer and said metal layer and which has an adhesion strength sufficient to effectively adhere said metal layer to said radiation-sensitive layer;
    (c) irradiating, after said metal layer and said second adhesive layer are additionally prepared, a focussed radiation beam to form on said carrier body a spot having a diameter of the order of microns, in a manner as to cause said radiation-sensitive layer to absorb energy of the beam and deform due to the discharging of the gas component, thereby forming a protuberance in said metal layer of said carrier body; and
    (d) directly using the carrier body having said protuberance as a stamper structure for manufacturing optical disks each of which comprises a substrate in a surface of which a groove corresponding in shape to the protubuerance is formed.

2. The method according to claim 1, wherein a laser beam is irradiated onto the carrier body having said metal layer and said second adhesive layer which are additionally formed on said radiation-sensitive layer.

3. The method according to claim 1, wherein a specific metal layer which has high releasability sufficient to be easily separated from disk substrates made of a resin is used as said metal layer, said second adhesive layer being interposed between said radiation-sensitive layer and said specific metal layer.

4. The method according to claim 1, wherein said step of forming said protuberance on said carrier body includes the step of:

rotating said carrier body while irradiating said carrier body with a laser beam of a substantially uniform intensity so as to form, on said rotating carrier body, said protuberance corresponding to a desired pre-groove serving as a track of the optical disks.

5. The method according to claim 4, wherein said step of forming said protuberance on said carrier body includes the step of:

rotating said carrier body while irradiating said carrier body which is being rotated with a continuous laser beam and moving the continuous laser beam in a radial direction of said carrier body, thereby forming a continuous spiral protuberance on said radiation-sensitive layer of said carrier body.

6. The method according to claim 1, wherein said step of forming said protuberance on said carrier body includes the step of:

rotating said carrier body while radiating a pulse-modulated laser beam digitally representing information onto said rotating carrier body, thereby forming a plurality of said protuberances on said radiation-sensitive layer of said carrier body, whereby when said carrier body is directly used as a stamper structure, read-only optical disks with data pre-pits are manufactured.

* * * * *